United States Patent
Onsrud et al.

(10) Patent No.: US 12,541,423 B1
(45) Date of Patent: Feb. 3, 2026

(54) COMPUTER CONTROL ERROR RECOVERY SYSTEMS

(71) Applicant: C. R. Onsrud, Inc., Troutman, NC (US)

(72) Inventors: Jeffrey Thomas Onsrud, Mooresville, NC (US); Ali Reza Bahar, Mooresville, NC (US)

(73) Assignee: C. R. Onsrud, Inc., Troutman, NC (US)

( * ) Notice: Subject to any disclaimer, the term of this patent is extended or adjusted under 35 U.S.C. 154(b) by 0 days.

(21) Appl. No.: 18/790,481

(22) Filed: Jul. 31, 2024

(51) Int. Cl.
G06F 11/00 (2006.01)
G06F 11/07 (2006.01)

(52) U.S. Cl.
CPC .............. *G06F 11/0793* (2013.01)

(58) Field of Classification Search
CPC ................................... G06F 11/0793
USPC ........................................ 714/1–57
See application file for complete search history.

(56) References Cited

U.S. PATENT DOCUMENTS

| | | | | |
|---|---|---|---|---|
| 2006/0259911 A1* | 11/2006 | Weinrich | ............. | G06Q 10/087 702/187 |
| 2015/0254115 A1* | 9/2015 | Kuroda | ................. | G06F 11/323 719/318 |
| 2022/0318115 A1* | 10/2022 | Cozma | ................. | G06F 11/3447 |
| 2023/0376406 A1* | 11/2023 | Gouda | ................... | G06N 20/00 |

* cited by examiner

*Primary Examiner* — Sarai E Butler
(74) *Attorney, Agent, or Firm* — Shumaker, Loop & Kendrick, LLP; Patrick B. Horne

(57) ABSTRACT

Systems and methods receive production machine data associated with a production machine to facilitate production diagnostics, the production machine data including a record of executed code for producing a product via the production machine, the production machine data being received in a non-standardized format. The production machine data are converted to a standardized format as standardized production machine data and stored as an aggregation of the standardized production machine data. The standardized production machine data are synchronized in accordance with instances in time and display data are generated that includes a time-based digital representation of the synchronized and standardized production machine data that indicates continuous production machine conditions over a period of time, where the display data indicates conditions of the production machine. The display data are transmitted to computing device(s) to facilitate remote access over a network to the continuous production machine conditions over the period of time.

20 Claims, 8 Drawing Sheets

COMPUTER CONTROL ERROR RECOVERY SYSTEMS

FIELD OF THE INVENTION

This invention relates generally to the field of production machines, and more particularly embodiments of the invention relate computer control error recovery systems for production machines.

BACKGROUND

Production machines are used in many manufacturing sectors to precisely and efficiently transform raw materials into finished goods. Each production machine is meticulously designed and calibrated to perform a specific task with unfaltering accuracy. Some products produced by these production machines are particularly complex, and it is important for these production machines to be reliable. Some production machines incorporate components or instrumentation that is very sensitive to environmental changes or conditions. These changes or conditions can disrupt the precision and efficiency of the production machines, which can cause many downstream consequences including lost production time, wasted raw materials, financial losses, and various other adverse effects. Thus, a need exists for improved systems and methods for minimizing these downstream consequences.

SUMMARY

Shortcomings of the prior art are overcome and additional advantages are provided through the provision of a computing system for vibration propagation measurement. The system includes at least one processor, a communication interface communicatively coupled to the at least one processor, and a memory device storing executable code. When the executable code is executed, it causes the at least one processor to, at least in part, receive production machine data associated with a production machine to facilitate production diagnostics, the production machine data including a record of executed code for producing a product via the production machine, the production machine data being received in a non-standardized format. The production machine data are converted to a standardized format as standardized production machine data and stored as an aggregation of the standardized production machine data. The system synchronizes the standardized production machine data in accordance with instances in time and generates display data that includes a time-based digital representation of the synchronized and standardized production machine data that indicates continuous production machine conditions over a period of time, the display data indicating conditions of the production machine. The display data are transmitted to one or more computing devices, thereby facilitating remote access over a network to the continuous production machine conditions over the period of time.

Additionally, disclosed herein is a computer-implemented method that includes, at least in part, receiving production machine data associated with a production machine to facilitate production diagnostics, the production machine data including a record of executed code for producing a product via the production machine, the production machine data being received in a non-standardized format. The method also includes converting the production machine data to a standardized format as standardized production machine data and storing the standardized production machine data as an aggregation of the standardized production machine data. The method also includes synchronizing the standardized production machine data in accordance with instances in time and generating display data that includes a time-based digital representation of the synchronized and standardized production machine data that indicates continuous production machine conditions over a period of time, the display data indicating conditions of the production machine. The display data are transmitted to one or more computing devices thereby facilitating remote access over a network to the continuous production machine conditions over the period of time.

Also disclosed herein is a production machine system. The production machine system includes, at least in part, a production machine that facilitates production of one or more products, at least one processor, and a communication interface communicatively coupled to the at least one processor and the production machine. The production machine system also includes a memory device storing executable code that, when executed, causes the at least one processor to, at least in part, receive production machine data associated with the production machine to facilitate production diagnostics, the production machine data including a record of executed code for producing the one or more products, the production machine data being received in a non-standardized format. The production machine data are converted to a standardized format as standardized production machine data that is stored as an aggregation of the standardized production machine data. The system synchronizes the standardized production machine data in accordance with instances in time and generates display data that includes a time-based digital representation of the synchronized and standardized production machine data that indicates continuous production machine conditions over a period of time, the display data indicating conditions of the production machine. The digital display data are transmitted to one or more computing devices thereby facilitating remote access over a network to the continuous production machine conditions over the period of time.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
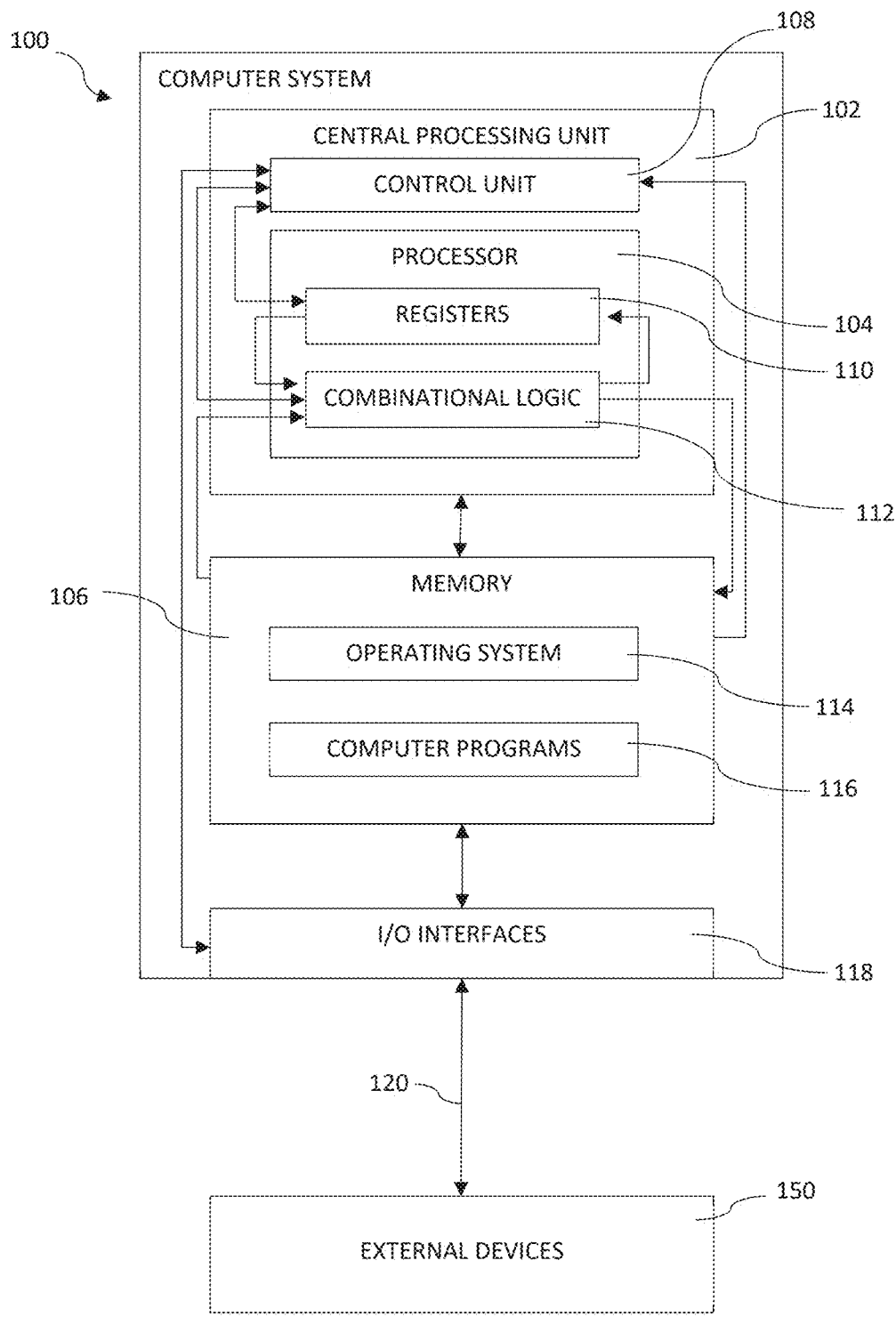
FIG. 1 depicts an example computer system configured to perform various processes described herein, according to an embodiment of the present invention.

Aspects of the present invention and certain features, advantages, and details thereof are explained more fully below with reference to the non-limiting examples illustrated in the accompanying drawings. It is to be understood that the disclosed embodiments are merely illustrative of the present invention and the invention may take various forms. Further, the figures are not necessarily drawn to scale, as some features may be exaggerated to show details of particular components. Thus, specific structural and functional details illustrated herein are not to be interpreted as limiting, but merely as a representative basis for teaching one skilled in the art to employ the present invention.

Descriptions of well-known processing techniques, systems, components, etc. are omitted to avoid obscuring the invention with well-known details. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

The specification may include references to "one embodiment," "an embodiment," "various embodiments," "one or more embodiments," etc. may indicate that the embodiment(s) described may include a particular feature, structure or characteristic, but every embodiment may not necessarily include the particular feature, structure, or characteristic. In some cases, such phrases are not necessarily referencing the same embodiment. When a particular feature, structure, or characteristic is described in connection with an embodiment, such description can be combined with features, structures, or characteristics described in connection with other embodiments, regardless of whether such combinations are explicitly described. Thus, unless described or implied as exclusive alternatives, features throughout the drawings and descriptions should be taken as cumulative, such that features expressly associated with some particular embodiments can be combined with other embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The terms "couple," "coupled," "couples," "coupling," "fixed," "attached to", and the like should be broadly understood to refer to connecting two or more elements or signals electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant. "Communicatively coupled to" and "operatively coupled to" can refer to physically and/or electrically related components.

In addition, as used herein, the terms "about," "approximately," or "substantially" for any numerical values or ranges indicate a suitable dimensional tolerance that allows the device, part, or collection of components to function for its intended purpose as described herein.

Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention. While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code can include both software and hardware. For example, program code in certain embodiments of the present invention can include fixed function hardware, while other embodiments can utilize a software-based implementation of the functionality described. Certain embodiments combine both types of program code.

As used herein, the term "provider" generally describes a person or business enterprise that hosts, maintains, otherwise provides, and/or uses computer systems that provide functionality for the disclosed systems and methods. In particular, the term "provider" may generally describe a person or business enterprise providing goods or services accessible via one or more user devices. Interactions between a provider system and a user device may utilize a communicative interaction between a computing system of the provider, and a user device of a user. For instance, user(s) may provide various inputs to a user device that can be interpreted and analyzed using processing systems of the user device and/or processing systems of the provider system. Further, the provider system and the user device may be in communication via a network. According to various embodiments, the provider system and/or user device(s) may also be in communication with external or third party devices (e.g., a third-party server) of a third-party system that may be used to perform one or more computing operations. In some embodiments, the functions of one illustrated system or server may be provided by multiple systems, servers, or computing devices, including those physically located at a central computer processing facility and/or those physically located at remote locations.

Embodiments of the present invention are described herein, with reference to flowchart illustrations and/or block diagrams of computer-implemented methods and computing systems according to embodiments of the invention. Each block of the flowchart illustrations and/or block diagrams, and combinations of blocks in the flowchart illustrations and/or block diagrams, can be implemented by computer readable program instructions that may be provided to a processor of a general purpose computer, special purpose computer, or other programmable data processing apparatus or apparatuses (the term "apparatus" includes systems and computer program products). In particular, the computer readable program instructions, which be executed via the processor of the computer or other programmable data processing apparatus, create a means for implementing the functions/acts specified in the flowchart and/or block diagram block or blocks.

In one embodiment, these computer readable program instructions may also be stored in one or more computer-readable storage media that can direct a computer or other programmable data processing apparatus, and/or other devices, to function in a particular manger, such that a computer readable storage medium of the one or more computer-readable storage media having instructions stored therein comprises an article of manufacture including instructions which implement aspects of the actions specified in the flowchart illustrations and/or block diagrams. In particular, the computer-readable program instructions may be used to produce a computer-implemented method by executing the instructions to implement the actions specified in the flowchart illustrations and/or block diagram block or blocks. Example computer readable storage media may include, but not be limited to, any electronic storage device, a magnetic storage device, an optical storage device, an electromagnetic storage device, a semiconductor storage device, or any suitable combination of the foregoing. A non-exhaustive list of example computer readable storage media include a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a microdrive, a mechanically encoded device such as punch-cards or raised structures in a groove having instructions recorded thereon, and any suitable combination of the foregoing. Computer readable storage media, as used herein, may be used for long-term, intermediate-term, and/or short-term storage of computer-readable instructions, but is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In another embodiment, these computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

Example computer program instructions may include assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language (e.g., Java, Ruby, Python, C#, hypertext preprocessor (PHP), C++, or the like, and procedural programming languages, such as FORTRAN, BASIC, the "C" programming language, or similar programming languages.

The computer program instructions, whether stored in the computer-readable storage medium and/or computer-readable memory may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

In the flowchart illustrations and/or block diagrams disclosed herein, each block in the flowchart/diagrams may represent a module, segment, a specific instruction/function or portion of instructions/functions, and incorporates one or more executable instructions for implementing the specified logical function(s). Additionally, the alternative implementations and processes may also incorporate various blocks of the flowcharts and block diagrams. For instance, in some implementations the functions noted in the blocks may occur out of the order noted in the figures. For example, two blocks shown in succession may be executed substantially concurrently, or the functions of the blocks may sometimes be executed in the reverse order, depending upon the functionality involved.

FIG. 1 depicts an example computer system 100 configured to perform various processes described herein, according to an embodiment of the present invention. The example computer system 100 may be incorporated into a user device that includes, for example, a laptop, a computer, a tablet, a mobile computing device such as a smart phone, a portable digital assistant, a pager, a television, a gaming device, an audio/video player, a virtual assistant device, an internet-of-things device, a smart home device, a wireless personal response device, any combination of the aforementioned, and/or any other electronic device with processing and communication capabilities. As used herein, a user can be an individual, a group, or an entity having access to the computer system 100. For instance, the term user may be one of many users, a market or community of users, customers, consumers, business entities, government entities, and groups of any size. The computer system 100 is in communication with one or more external device(s) 150, which may include, for example, devices (e.g., server(s)) of a provider system. The computer system 100 includes one or more central processing unit(s) 102 (CPU) that includes one or more processor(s) 104. The CPU(s) 102 and/or additional processor(s) 104 include functional components used in the execution of instructions and/or otherwise may be configured to perform a computer-implemented method by executing instructions. For example, the CPU(s) 102 and/or additional processor(s) 104 may include functional components to fetch program instructions from one or more locations such as the memory 106, which may include a cache or main memory. The CPU(s) 102 and/or additional processor(s) 104 may decode the program instructions and execute the program instructions, which may or may not require accessing the memory 106 as part of the instruction execution. Further, the CPU(s) 102 and/or additional processor(s) 104 may write results of the executed instructions to, for example, a destination register for storing the result of the execution, or various other locations for further processing and/or storage. The CPU 102 may include a control unit 108 that directs the operation of the processor(s) 104 and may include, for example, a binary decoder to convert coded instructions into timing and control signals that direct the operation of various other components (e.g., memory 106) of the computer system 100.

Processor(s) 104 may include circuitry for implementing communication and/or logic functions of the computer system 100. The processor(s) 104 may include a digital signal processor, a microprocessor, a graphics processing unit (GPU), a microcontroller, an application-specific integrated circuit (ASIC), a programmable logic device (PLD), digital signal processor (DSP), a field programmable gate array (FPGA), programmable logic arrays (PLA) a state machine, a controller, gated or transistor logic, discrete physical hardware components, various analog to digital converters, digital to analog converters, and/or other support circuits and/or combinations thereof. According to various embodiments, the processor(s) 104 may also include register(s) 110 that configured as a small amount of fast storage and may be used and/or otherwise accessed by one or more of the functional components for various operations (e.g., arithmetic operations, bitwise operations, etc.). The processor(s) 104 may also utilize a combinational logic system 112 to perform various calculations (e.g., using Boolean algebra) on input signals and stored data to produce specified outputs from such inputs. Control and signal processing functions of the computer system 100 are allocated between these processor(s) 104 according to their respective capabilities based on the functionality used to encode and interleave messages and data prior to modulation and transmission thereof. Processor(s) 104 may include an internal data modem and other functionality to operate software programs (e.g., computer programs 116). In one non-limiting example, the processor(s) 104 may be capable of operating a connectivity program, such as a web browser application, that may then allow the computer system 100 to transmit and receive (e.g., to one or more external device(s) 150) content such as, for example, web content, location-based content, etc. in accordance with a Wireless Application Protocol (WAP), Hypertext Transfer Protocol (HTTP), and/or the like.

The memory 106 may be operatively coupled to the processor(s) 104 and can be or include main or system memory (e.g. RAM), non-volatile memory, volatile memory, or any computer readable storage media used to store data, code or other information that the processor(s) 104 use in the execution of program instructions. Memory 106 can include storage device(s) such as hard drive(s), flash media, optical media, and/or cache memory that may be embedded and/or removable, as examples. Memory 106 can include, for instance, a cache, such as a shared cache, which may be coupled to local caches (examples include L1 cache, L2 cache, etc.) of processor(s) 104. In various embodiments, the memory 106 includes any tangible device that can retain and store instructions for use ban an instruction execution device (e.g., processor(s) 104). The memory 106 can store any number of pieces of information and data used by the computer system 100 to implement functions described herein as well as other functions not expressly described.

Additionally, memory 106 may be or include at least one computer program product having a set (e.g., at least one) of program modules, instructions, code or the like that is/are configured to carry out functions of embodiments described herein when executed by the processor(s) 104. Memory 106 can store an operating system 114, other computer programs 116, such as one or more computer programs/applications that execute to perform aspects described herein, and/or various other data items. Specifically, programs/applications can include computer readable program instructions and code that may be configured to carry out functions of embodiments of aspects described herein, and can also include cashed data, user files, audio files, video recordings, files downloaded or received from other devices, and/or other data items required or related to any or all of the programs/applications. Example programs/applications can include integrated software applications that manage device resources, generate user interfaces, accept user inputs, and facilitate communications with other devices among other functions. The integrated software applications can include an operating system, such as Linux®, UNIX®, Windows®, macOS®, iOS®, Android®, or other operating system compatible with personal computing devices. Programs/applications can also include applications (e.g., a mobile application) considered web-browser applications that typically provide a graphical user interface (GUI) that can be displayed (e.g., via a user interface) and may include features for accepting inputs from users (e.g., via control puts such as text boxes, data fields, hyperlinks, pull down menus, check boxes, and the like). Example GUI display screens may include features for displaying information and accepting inputs from users, and may include control inputs such as text boxes, data fields, hyperlinks, pull-down menus, check boxes, radio buttons, and the like. One of ordinary skill in the art will appreciate that the exemplary functions and user-interface display screens are not intended to be limiting, and an integrated software application may include other display screens and functions.

Computer system 100 may also include input/output (I/O) interfaces 118 through which external device(s) 150 are connected. Example external device(s) 150 in some examples may include an external sever, workstation, set of servers, cloud-based application or system, etc. located outside of the user computer system 100 that the computer system 100 may access via the Internet. In some examples, external device(s) 150 may additionally or alternatively include electrical components included within the user device itself. Specifically, an I/O device may be incorporated into the computer system 100 itself or the I/O device may be regarded as an external device 150 coupled to the computer system 100 through one or more I/O interfaces 118.

External device(s) 150 can include, but are not limited to, printers, display monitors, microphone(s), speaker(s), Global Positioning System (GPS) devices, camera(s) (e.g., digital cameras), lights, non-transitory storage media (e.g., ROM), accelerometers, gyroscopes, magnetometers, sensor devices configured to sense light, proximity, heart rate, body and/or ambient temperature, blood pressure, and/or skin resistance, activity monitors, a keyboard, a pointing device, a joystick, a button, soft key, infrared sensor, a display screen (e.g., a liquid crystal display (LCD), light emitting diode (LED) display, or the like), a sensitive input screen (e.g., a touch screen or the like), a proximity sensor or transmitter configured to detect proximate images (e.g., a quick response QR code) or objects (e.g., a radio-frequency identification tag) using electromagnetic fields, and/or any other devices that enable a user to interact with computer system 100, any device that enables computer system 100 to communicate with one or more other computing systems or peripheral devices, one or more data storage devices, which may store one or more programs, one or more computer readable program instructions, and/or data, etc., removable/non-removable storage media, volatile/non-volatile computer system storage media, a magnetic disk drive for reading from and writing to a removable, non-volatile magnetic disk (e.g., a "floppy disk"), an optical disk drive for reading from or writing to a removable, non-volatile optical disk, such as a CD-ROM, DVD-ROM or other optical media, non-volatile magnetic media (typically called a "hard drive"), and/or any other suitable devices adapted to provide an input or output to the computer system 100 and/or commonly used with any suitable operating system on personal computers, central computing systems, phones, and/or similar devices.

I/O interfaces 118 may provide communication (e.g., two-way communication and data exchanges). Example I/O interfaces 118 may additionally or alternatively include, for example, a network interface/adapter that enables the computer system 100 to communicate with one or more networks, such as a local area network (LAN), a general wide area network (WAN), and/or a public network (e.g., the Internet), and/or provide communication with other computing devices or systems, storage devices, or the like. Specific examples of I/O interfaces 118 may also include Ethernet-based (such as Wi-Fi) interfaces, near-field communication devices, transceivers, and/or Bluetooth® adapters. (BLUETOOTH is a registered trademark of Bluetooth SIG, Inc., Kirkland, Washington, U.S.A.). The I/O interfaces 118 may be configured, in some embodiments, as a means for providing user inputs via virtual buttons, selectable options, a virtual keyboard, a touch screen, a touchpad, and other indicia that, when touched, can be used by the user to control the computer system 100. The I/O interfaces 118 may include and/or be operatively connected to circuitry used to convert analog signals and/or other signals into digital data, and/or may be configured to convert digital data to another type of signal. For example, the I/O interfaces 118 may receive and convert physical contact inputs, physical movements, auditory signals, etc. to digital data. Once converted, the digital data may be provided to the processor(s) 104 for processing.

The I/O interfaces 118 may be coupled to processor(s) 104, external device(s), and each other via one or more buses, circuitry, intraconnections, and/or other connections that facilitate communication. Bus connections represent one or more of any of several types of bus structures, including a memory bus or memory controller, a peripheral bus, an accelerated graphics port, a high-speed interface, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI). The bus connections may operatively couple and/or electrically connect various components of the computer system 100 with one another directly or indirectly by way of intermediate components.

The communication between I/O interfaces 118 and external devices 150 can occur across wired and/or wireless communications link(s) 120, such as Ethernet-based wired, universal serial bus (USB) wired or wireless connections. Example wireless connections include cellular, Wi-Fi, Bluetooth®, proximity-based, near field, or other types of wireless connections. More generally, communications link(s) 120 may be any appropriate wireless and/or wired communication link(s) 120 for communicating data. In some instances, the communications link(s) may utilize various modes and/or protocols, including, as non-limiting examples, global system for mobile (GSM) voice communication, short message service (SMS), enterprise messaging service (EMS), multimedia messaging service (MMS) messaging, second-generation (2G) wireless communication protocols IS-95 such as code division multiple access (CDMA), IS-136 such as time division multiple access (TDMA), personal digital cellular (PDC), or general packet radio service (GPRS), third-generation (3G) wireless communication protocols, such as Universal Mobile Telecommunications System (UMTS), CDMA2000, wideband CDMA (WCDMA) and/or time division-synchronous CDMA (TD-SCDMA), (fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like.

Specific example I/O interfaces 118 that may be used to perform the processes disclosed herein may incorporate and or otherwise be configured to capture an image (e.g., via camera(s) and/or other optical instrument(s)). The I/O interfaces 118 may include one or more lenses and one or more image sensors (e.g., a charge coupled device (CCD) sensor) configured to convert photons into an electrical signal. For example, pixels of each the image sensors may each include a photodiode (e.g., a semiconductor) that becomes electrically charged in accordance with the strength of the light that strikes the photodiode, where the electrical charge is then relayed to be converted to an electrical signal. In one embodiment, a series of pulses may be applied to the one or more image sensors to relay the accumulate charges within each photodiode in succession down a row of photodiodes to an edge of the respective image sensor. Other optical instrument functionalities are also contemplated herein.

In various embodiments, the I/O interfaces 118 may be configured to obtain and/or process various forms of authentication by obtaining authentication information from a user of a user device accessing or that otherwise incorporates the computer system 100. The authentication information may be provided, for example, to access specific information that is restricted to authorized users. In one example, a restricted web portal may require login credentials from the user in order to provide the user with access to the web portal and perform various functionalities therethrough. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems. For instance, in some cases, in order to authenticate a user, the user may be required to provide multi-factor authentication by requiring more than one authentication method.

In various embodiments, the I/O interfaces 118 may include a positioning device and/or otherwise be configured to identify a geographic location of a user device using a positioning system. For example, the I/O interfaces 118 may include a GPS transceiver, an antenna, transmitter, and/or receiver that can be used, via triangulation of cellular signals, to identify an approximate location of a user device.

The I/O interfaces 118 can include sensors of various types and functionalities. The sensors may be arranged as a directional sensor array, and the system may be operative to estimate the number, magnitude, frequency, Direction-Of-Arrival (DOA), distance, or speed of the signal (i.e., the vibration) impinging the sensor array. The system may process the sensor array outputs. The sensors may be or include a piezoelectric sensor that uses the transverse, longitudinal, or shear effect mode of the piezoelectric effect. In some embodiments, the sensor may be based on or include ultrasonic-waves propagation, sensing eddy-currents, based on proximity sensor. In some embodiments, the sensors may be a bulk or surface acoustic sensor, or may be an atmospheric or an environmental sensor.

Also contemplated herein are embodiments in which the sensors may be or include a thermoelectric sensor that senses or responds to a temperature or a temperature gradient of an object using conduction, convection, or radiation, and may consist of, or comprise, a Positive Temperature Coefficient (PTC) thermistor, a Negative Temperature Coefficient (NTC) thermistor, a thermocouple, a quartz crystal, or a Resistance Temperature Detector (RTD). Some example sensors may include radiation-based sensor that responds to radioactivity, nuclear radiation, alpha particles, beta particles, or gamma rays, and may be based on gas ionization. In some embodiments, the sensor may be a photoelectric sensor that responds to a visible or an invisible light or both, such as infrared, ultraviolet, X-rays, or gamma rays. The photoelectric sensor may be based on the photoelectric or photovoltaic effect, and consists of, or comprises, a semiconductor component such as a photodiode, a phototransistor, or a solar cell. Example photoelectric sensors may be based on Charge-Coupled Device (CCD) or a Complementary Metal-Oxide Semiconductor (CMOS) element. In some embodiments, sensors may be or include a photosensitive image sensor array comprising multiple photoelectric sensors, and may be operative for capturing an image and producing an electronic image information representing the image, and may comprise one or more optical lens for focusing the received light and mechanically oriented to guide the image, and the image sensor may be disposed approximately at an image focal point plane of the one or more optical lens for properly capturing the image. An image processor may be coupled to the image sensor for providing a digital data video signal according to a digital video format, the digital video signal carrying digital data video based on the captured images, and the digital video format may be according to, or based on, one out of: TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format) and DPOF (Digital Print Order Format) standards. A video compressor may be coupled to the image sensor for lossy or non-lossy compressing of the digital data video, and may be based on a standard compression algorithm such as JPEG (Joint Photographic Experts Group) and MPEG (Moving Picture Experts Group), ITU-T H.261, ITU-T H.263, ITU-T H.264, or ITU-T CCIR 601.

According to various embodiments, the sensors may be an electrochemical sensor and may respond to an object chemical structure, properties, composition, or reactions. For example, the electrochemical sensor may include a pH meter or may be a gas sensor responding to the presence of radon, hydrogen, oxygen, or carbon-monoxide. The electrochemical sensor may be a smoke, a flame, or a fire detector, and may be based on optical detection or on ionization for responding to combustible, flammable, or toxic gas.

In some embodiments, the sensors may be or include a physiological sensor and may respond to parameters associated with a live body, and may be external to the sensed body, implanted inside the sensed body, attached to the sensed body, or wearable on the sensed body. The physiological sensor may be responding to body electrical signals such as an EEG Electroencephalography (EEG) or an Electrocardiography (ECG) sensor, or may be responding to oxygen saturation, gas saturation, or blood pressure.

In some embodiments, the sensors may be or include an electroacoustic sensor and may respond to a sound, such as inaudible or audible audio. The electroacoustic sensor may be a an omnidirectional, unidirectional, or bidirectional microphone, may be based on the sensing the incident sound based motion of a diaphragm or a ribbon, and may consist of, or comprise, a condenser, an electret, a dynamic, a ribbon, a carbon, or a piezoelectric microphone.

In some embodiments, the sensors may be or include an electric sensor and may respond to or measure an electrical characteristics or electrical phenomenon quantity, and may be conductively, non-conductively, or non-contact couplable to the sensed element. The electrical sensor may be responsive to Alternating Current (AC) or Direct Current (DC), and may be an ampermeter and respond to an electrical current passing through a conductor or wire. The ampermeter may consist of, or comprises, a galvanometer, a hot-wire ampermeter, a current clamp, or a current probe. The electrical sensor may be, for example, a voltmeter and may respond to or measure an electrical voltage. The voltmeter may include an electrometer, a resistor, a potentiometer, and/or a bridge circuit. The electrical sensor may be a wattmeter such as an electricity meter that responds to electrical energy, and may measure or respond to active electrical power. The wattmeter may be based on induction, or may be based on multiplying measured voltage and current. In some embodiments, electrical sensors may be or include an impedance meter and may respond to the impedance of the sensed element such as bridge circuit or an ohmmeter, and may be based on supplying a current or a voltage and respectively measuring a voltage or a current. The impedance meter may be a capacitance or an inductance meter (or both) and may respond to the capacitance or the inductance of the sensed element, being measuring in a single frequency or in multiple frequencies. In some embodiments, electrical sensors may be a Time-Domain Reflectometer (TDR) and may respond to the impedance changes along a conductive transmission line, such as an optical TDR that may respond to the changes along an optical transmission line.

The sensors may, according to various embodiments, include a magnetic sensor and may respond to an H or B magnetic field, and may consists of, or may be based on, a Hall effect sensor, a MEMS, a magneto-diode, a magneto-transistor, an AMR magnetometer, a GMR magnetometer, a magnetic tunnel junction magnetometer, a Nuclear precession magnetic field sensor, an optically pumped magnetic field sensor, a fluxgate magnetometer, a search coil magnetic field sensor, or a Superconducting Quantum Interference Device (SQUID) magnetometer. The magnetic sensor may be MEMS based, and may be a Lorentz force based MEMS sensor or may be an Electron Tunneling based MEMS. In some embodiments, the sensors may be a tactile sensor and may respond to a human body touch, and may be based on a conductive rubber, a lead zirconate titanate (PZT) material, a polyvinylidene fluoride (PVDF) material, a metallic capacitive element, or any combination thereof.

The sensors may be or include a single-axis, 2-axis, or 3-axis motion sensor and may respond to the magnitude, direction, or both, of the sensor motion. The motion sensor may be a piezoelectric, a piezoresistive, a capacitive, or a MEMS accelerometer and may respond to the absolute acceleration or the acceleration relative to freefall. The motion sensor may be an electromechanical switch and may consist of, or comprises, an electrical tilt, or a vibration switch. In some embodiments, the sensors may be or include a force sensor and may respond to the magnitude, direction, or both, of a force, and may be based on a spring extension, a strain gauge deformation, a piezoelectric effect, or a vibrating wire. The force sensor may be a dynamometer that responds to a torque or to a moment of the force.

In some embodiments, the sensor may be or include a pressure sensor and may respond to a pressure of a gas or a liquid, and may consist of, or comprise, an absolute pressure sensor, a gauge pressure sensor, a vacuum pressure sensor, a differential pressure sensor, or a sealed pressure sensor. The pressure sensor may be based on a force collector, the piezoelectric effect, a capacitive sensor, an electromagnetic sensor, or a frequency resonator sensor.

The sensors may be or include an absolute, a relative displacement, or an incremental position sensor, and may respond to a linear or angular position, or motion, of a sensed element. The position sensor may be an optical type or a magnetic type angular position sensor, and may respond to an angular position or the rotation of a shaft, an axle, or a disk. The angular position sensor may be based on a variable-reluctance (VR), an Eddy-current killed oscillator (ECKO), a Wiegand sensing, or a Hall-effect sensing, and may be transformer based such as an RVDT, a resolver or a synchro. The angular position sensor may be an electromechanical type such as an absolute or an incremental, mechanical or optical, rotary encoder. The angular position sensor may be an angular rate sensor and may respond to the angular rate, or the rotation speed, of a shaft, an axle, or a disc, and may consist of, or comprise, a gyroscope, a tachometer, a centrifugal switch, a Ring Laser Gyroscope (RLG), or a fiber-optic gyro. The position sensor may be a linear position sensor and may respond to a linear displacement or position along a line, and may consist of, or comprise, a transformer, an LVDT, a linear potentiometer, or an incremental or absolute linear encoder. In some embodiments, the sensors may include a motion detector and may respond to a motion of an element, and may based on sound, geomagnetism, reflection of a transmitted energy, electromagnetic induction, or vibration. The motion detector may consist of, or comprise, a mechanically-actuated switch.

For some production machines, the sensors may include a strain gauge and may respond to the deformation of an object, and may be based on a metallic foil, a semiconductor, an optical fiber, vibrating or resonating of a tensioned wire, or a capacitance meter. The sensor may be a hygrometer and may respond to an absolute, relative, or specific humidity, and may be based on optically detecting condensation, or based on changing the capacitance, resistance, or thermal conductivity of materials subjected to the measured humidity. The sensor may be a clinometer and may respond to inclination or declination, and may be based on an accelerometer, a pendulum, a gas bubble in liquid, or a tilt switch.

In some embodiments, the sensors may include a flow sensor and may measure the volumetric or mass flow rate via a defined area, volume or surface. The flow sensor may be a liquid flow sensor and may be measuring the liquid flow in a pipe or in an open conduit. The liquid flow sensor may be a mechanical flow meter and may consist of, or comprise, a turbine flow meter, a Woltmann meter, a single jet meter, or a paddle wheel meter. The liquid flow sensor may be a pressure flow meter based on measuring an absolute pressure or a pressure differential. The flow sensor may be a gas or an air flow sensor such as anemometer for measuring wind or air speed, and may measure the flow through a surface, a tube, or a volume, and may be based on measuring the air volume passing in a time period. The anemometer may consist of, or comprise, cup anemometer, a windmill anemometer, a pressure anemometer, a hot-wire anemometer, or a sonic anemometer. In some embodiments, the sensors may include a gyroscope for measuring orientation in space, and may consist of, or comprise, a MEMS, a piezoelectric, a FOG, or a VSG gyroscope, and may be based on a conventional mechanical type, a nanosensor, a crystal, or a semiconductor.

The sensors may additionally or alternatively include an image sensor for capturing an image or video, and the system may include an image processor for recognition of a pattern, and the control logic may be operative to respond to the recognized pattern such as appearance-based analysis of hand posture or gesture recognition. The system may comprise an additional image sensor, and the control logic may be operative to respond to the additional image sensor such as to cooperatively capture a 3-D image and for identifying the gesture recognition from the 3-D image, based on volumetric or skeletal models, or a combination thereof.

In some embodiments, the sensor may include an image sensor for capturing still or video image, and the sensor or the system may comprise an image processor having an output for processing the captured image (still or video). The image processor (hardware or software based, or a hardware/software combination) may be encased entirely or in part in the first device, the router, the control server, or any combination thereof, and the control logic may respond to the image processor output. The image sensor may be a digital video sensor for capturing digital video content, and the image processor may be operative for enhancing the video content such as by image stabilization, unsharp masking, or super-resolution, or for Video Content Analysis (VCA) such as Video Motion Detection (VMD), video tracking, egomotion estimation, identification, behavior analysis, situation awareness, dynamic masking, motion detection, object detection In some embodiments, the sensor(s) output an analog signal, and the device further comprising an Analog to Digital (A/D) converter coupled between the sensor(s) and the processor(s) 104 for converting the analog signal to a digital data.

In some embodiments, particular portions or steps of methods and functions described herein are performed in whole or in part by way of the CPU 102, processor(s) 104, and/or cloud-based computing devices/systems such that the computer system 100 facilitates operations that may only partially be performed locally and may incorporate communication, data transfer, and/or user inputs and outputs.

According to various embodiments, the user of the computer system 100 can be any individual, a group, entity, etc. that is in possession of or has access to a user device which may be personal or public devices used to access the computer system 100. The user can provide inputs to the computer system 100 through, for example, user-side actions including voice, text, movement, and/or graphical indicia selections Computer system 100 may be operational with numerous other general purpose or special purpose computing system environments or configurations. Computer system 100 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like. The computer system 100 may also be referred to herein as a data processing device/system, computing device/system/node, or simply a computer. The computer system 100 may be based on one or more of various system architectures and/or instruction set architectures.

In some embodiments, the computing system environments may be configured such that the computer system 100 can generate content data manually or obtain content data from a third-party source, such as a cloud storage service or remote database. In some embodiments, the content that can be accessed can include audio data or alphanumeric text data representing written communication. The third-party system can be integrated with the computer system 100 through an application programmable interface (API) software application that facilitates communication between software systems by mapping computer-readable commands and data formats between systems. In some embodiments, the computer system 100 accesses the third-party system using an Internet browser software application to access a web-based software interface.

Figure 2:
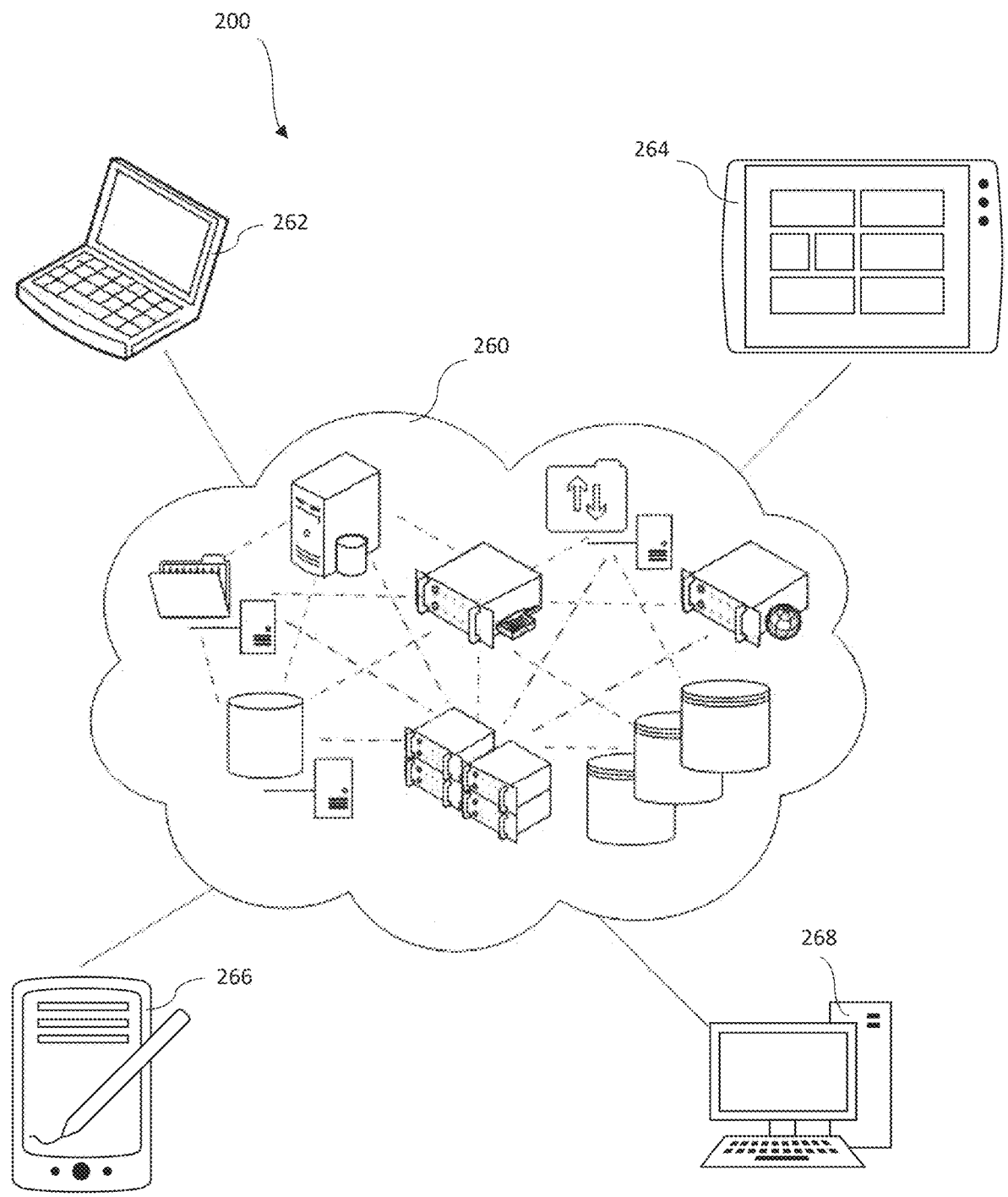
FIG. 2 depicts an example cloud computing environment, according to an embodiment of the present invention.

FIG. 2 depicts an example cloud-computing environment 200, according to an embodiment of the present invention. The cloud-computing environment 200 may be provided by a "provider" and include a network 260 that is communicatively connected, via wireless and/or wired connections to various network devices that may be local and/or remote to one another. Example network devices may include the user devices, such as laptop 262, tablet 264, smart phone 266, and desktop 268, as well as various other computing devices, mobile devices, and/or servers. As depicted, the network 260 can be a large distributed network that includes multiple servers (e.g., file servers, catalog servers, computing servers, application servers, etc.), databases, storage locations, and/or computers. The network 260 may facilitate sharing data and/or resources across distributed locations. Although singly depicted with one network 260 for illustrative convenience, the cloud-computing environment 200 may include more than one network without departing from the scope of this description. In some embodiments, the network 260 may be or include a secured network. In some embodiments, the network 260 may be implemented, at least in part, through one or more connections to the Internet. In some embodiments, a portion of the network 260 may include a virtual private network (VPN) or an Intranet.

The cloud-computing environment 200 may also include wired and wireless links, including, as non-limiting examples, 802.11a/b/g/n/ac, 802.20, WiMAX, LTE, and/or any other wireless link. The network 260 may include any internal or external network, networks, sub-network, and combinations of such operable to implement communications between various computing components within and beyond the illustrated cloud-computing environment 200. The network 260 may communicate, for example, Internet Protocol (IP) packets, frames using frame relay, voice, video, data, and other suitable information between network addresses. The network 260 may also include one or more local area networks (LANs), radio access networks (RANs), metropolitan area networks (MANs), wide area networks (WANs), personal area networks (PANs), WLANs, campus area network (CAN), storage-area network (SAN), all or a portion of the internet and/or any other communication system or systems at one or more locations.

The network 260 may incorporate various cloud-based deployment models including, for example, private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public that remain unique entities but are bound together by standardized or proprietary technology that enables data and application portability (e.g., load-balancing between cloud networks).

At least some of the network devices, such as the user devices (e.g., laptop 262, tablet 264, smart phone 266, and desktop 268) may include a computer system, such as the computer system 100 of FIG. 1. The network 260 may also include any number of data sources, user devices, consumers, customers, third-party devices, external databases, servers, etc. from any number of users (e.g., individual persons, institutions, companies, organizational entities, groups, etc.). In some embodiments, the network 260 incorporates any number of virtual resources, such as cloud resources or virtual machines. Virtual resources may utilize a cloud-computing configuration to provide an infrastructure that includes a network of interconnected nodes and provides stateless, low coupling, modularity and semantic interoperability. Such interconnected nodes may incorporate a computer system that includes one or more processors, a memory, and a bus that couples various system components (e.g., the memory) to the processor, and may be grouped physically or virtually in one or more networks. It should be understood that such interconnected nodes may include the types of computing devices and systems depicted, as an example, in FIG. 1, which is intended to be illustrative only, and such interconnected nodes can communicate with any type of computerized device across the network 260. Such virtual resources may be available for shared use among multiple distinct resource consumers and in certain implementations, virtual resources do not necessarily correspond to one or more specific pieces of hardware, but rather to a collection of pieces of hardware operatively coupled within a cloud-computing configuration so that the resources may be shared as needed.

Cloud computing utilized by the cloud-computing environment 200 is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Processes described herein may be performed singly or collectively by one or more computer systems (e.g., such as computer system 100) that are accessible via the network 260. It is to be understood that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

The network 260 of the cloud-computing environment 200 may be configured to be accessed by a network device (e.g., laptop 262, tablet 264, smart phone 266, and desktop 268) to provision computing capabilities, such as server time and network storage, as needed without requiring human interaction with the provider. Further, the network 260 may be accessed through standard computer systems (e.g., via I/O interfaces 118 of computer system 100) used by thin or thick client platforms (e.g., mobile phones, laptops, PDAs, etc.). Further, the network 260 may pool computing resources to serve multiple network devices using, for example, a multi-tenant model with various physical and virtual resources assigned in accordance with demand. For instance, physical and/or virtual resources accessed via the network 260 may be dynamically assigned and reassigned to different end-users such that the end-user has no control or knowledge of the exact location of the provider resources accessed via the network 260, although general abstraction may be used to identify a datacenter location, city, state, country, etc. The network 260 may also be scaled and provisioned, sometimes automatically, rapidly and elastically based on various functionality requirements and/or usages. In some instances, the network resources available via the network 260 may be regulated based on a metering capability (e.g., based on storage, processing, bandwidth, active user accounts, etc.).

Figure 3:
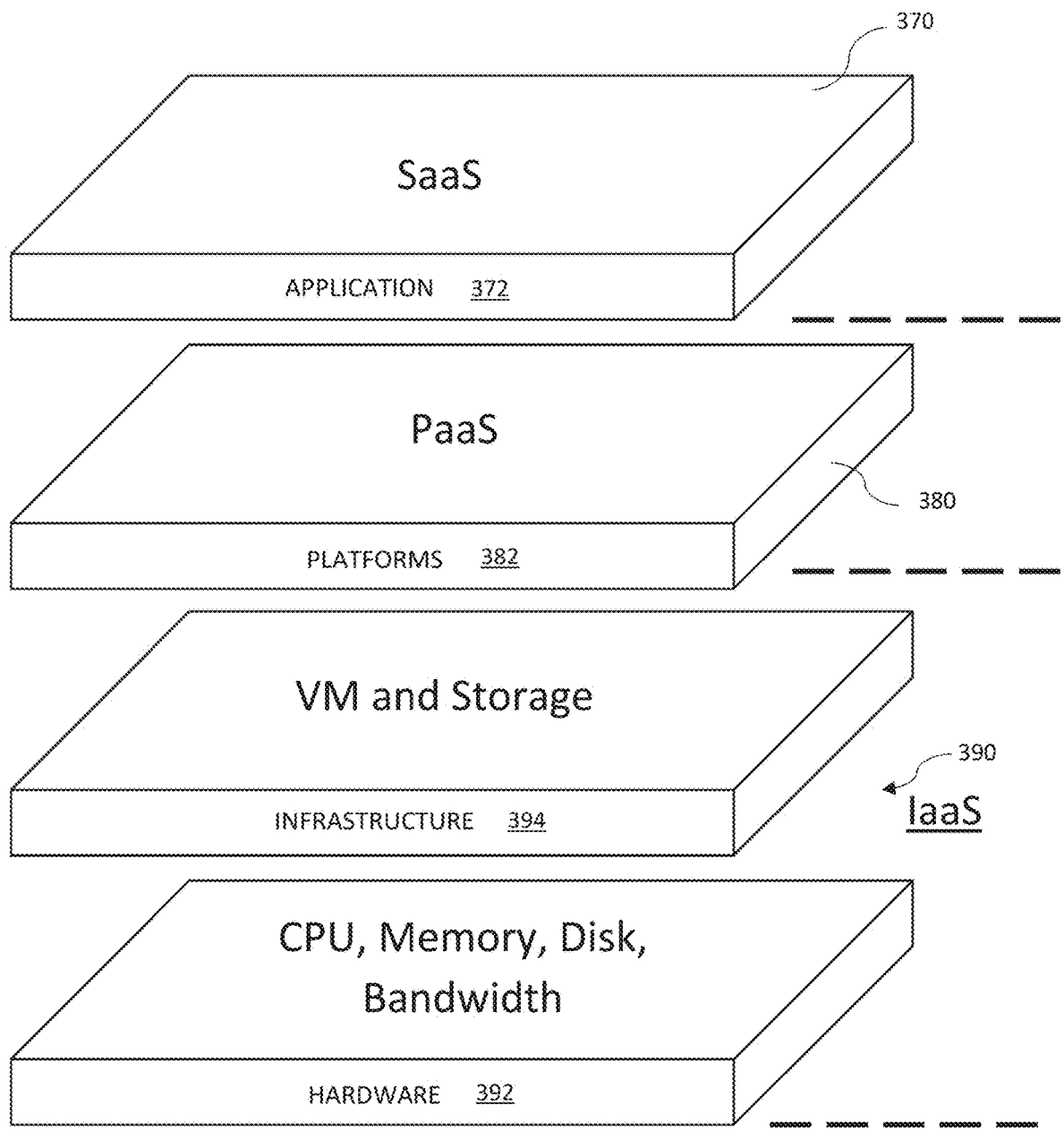
FIG. 3 depicts an example of cloud computing layers, according to an embodiment of the present invention.

FIG. 3 depicts an example of cloud computing services, according to an embodiment of the present invention. The cloud computing services may be utilized by a cloud computing environment (e.g., cloud-computing environment 200) and may include a Software-as-a-Service (SaaS) 370, a Platform as a Service (PaaS) 380, and/or an Infrastructure as a Service (IaaS) 390. The cloud computing services offer infrastructure, platforms, and/or applications/software as services to and end-user so that the end-user does not need to maintain resources on a local computing device.

The SaaS service 370 may provider an end-user with the ability to use the provider's applications that are accessible and operable via cloud infrastructure. Specifically, the provider's applications layer 372 may be accessible via various network devices that include computer systems (e.g., computer system 100) via, for example, a thin client interface such as a web browser. With the SaaS model, the end-user is not authorized to manage or control the underlying cloud infrastructure, network, servers, operating systems, storage, or individual application capabilities offered by the provider, with the exception of limited user-specific application configuration settings.

The PaaS service 380 may provide the end-user with the ability to deploy consumer-created or acquired applications onto the cloud infrastructure using a platform layer 382, where the consumer-created applications may be created using programming languages and tools supported by the provider. Specifically, the end-user is not authorized to manage or control the underlying cloud infrastructure including networks, servers, operating systems, or storage. However, the end-user is authorized to control the deployed applications and possibly application hosting environment configurations available via the platform layer 382.

The IaaS 390 service may provide the end-user with the ability to provision processing, storage, networks, and other fundamental computing resources. The IaaS service includes a hardware layer 392 that is responsible for managing the physical resources available via the cloud-computing environment (e.g., cloud-computing environment 200). Specifically, the hardware layer 392 may include physical servers, routers, switches, power and cooling systems and may, according to one embodiment, be implemented using one or more data centers that incorporate many (e.g., hundreds, thousands, etc.) of interconnected servers, CPUs, mainframes, reduced instruction set computer (RISC), architecture based servers, blade servers, storage devices, network computing components, memory, disk, bandwidth, etc. organized through switches, routers, and/or other fabrics.

IaaS service 390 may also include an infrastructure layer (e.g., a virtualization layer) 394 that includes virtual machine capabilities and storage capabilities using computing resources that may be partitioned using various virtualization technologies (e.g., a hypervisor that runs directly on the system hardware (e.g., Xen), a kernel-based virtual machine (KVM), Hyper-V virtualization, VMware software, etc.). With IaaS service 390, the end-user may be able to deploy and run arbitrary software, which can include operating systems and applications, via the virtual machines. Although the end-user would not be authorized to manage or control the underlying cloud infrastructure, the end-user would be authorized to control operating systems, storage, deployed applications, and some limited network components (e.g., host firewalls).

Although various embodiments are described above, these are only examples. For example, computing environments of other architectures can be used to incorporate and use one or more embodiments. Many variations are possible.

Artificial intelligence may use various algorithmic applications to leverage and interpret data to make predictions and/or decisions. Artificial intelligence may incorporate decision tree learning, association rule learning, artificial neural networks, recurrent artificial neural networks, long short-term memory (LSTM) networks, recurrent neural networks (RNN), inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, artificial intelligence may include one or more regression algorithms configured to output a numerical value given an input and/or one or more pattern recognition algorithms (e.g., a module, subroutine or the like capable of translating text or string characters and/or a speech recognition module or subroutine). In various embodiments, the machine learning module may include a machine learning acceleration logic, e.g., a fixed function matrix multiplication logic, in order to implement the stored processes and/or optimize the machine learning logic training and interface.

Artificial intelligence may incorporate machine learning models that are trained using various data inputs and techniques. Example training methods may include, for example, supervised learning, (e.g., decision tree learning, support vector machines, similarity and metric learning, etc.), unsupervised learning, (e.g., association rule learning, clustering, etc.), reinforcement learning, semi-supervised learning, self-supervised learning, multi-instance learning, inductive learning, deductive inference, transductive learning, sparse dictionary learning and the like. Example clustering algorithms used in unsupervised learning may include, for example, k-means clustering, density based special clustering of applications with noise (DBSCAN), mean shift clustering, expectation maximization (EM) clustering using Gaussian mixture models (GMM), agglomerative hierarchical clustering, or the like. According to one embodiment, clustering of data may be performed using a cluster model to group data points based on certain similarities using unlabeled data. Example cluster models may include, for example, connectivity models, centroid models, distribution models, density models, group models, graph based models, neural models and the like.

One subfield of machine learning includes neural networks that process information to find connections and derive meaning from undefined data. A neural network can, in a sense, learn to perform tasks by interpreting tokens. In the field of artificial intelligence, machine learning models provide a deep learning architecture that relies on parallel and multi-head attention mechanisms to train models on large datasets. The machine learning models may be associated with or perform processes via one or more processors, memory devices, and/or storage devices of a computing system or device. In some embodiments, artificial intelligence processes described herein may be incorporated within an existing system architecture, or such processes may be configured as a standalone, modular component, controller, or the like communicatively coupled to the computing system. Artificial intelligence may be utilized to perform various methods and functions as described or implied herein.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between $-1$ and $1$) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

The outputs from the multi-head attention mechanism pass into feed-forward neural network layers. A feedforward network (see, e.g., feedforward network 460 referenced in FIG. 4A) may include a topography with a hidden layer 464 between an input layer 462 and an output layer 466. The input layer 462, having nodes commonly referenced in FIG. 4A as input nodes 472 for convenience, communicates input data, variables, matrices, or the like to the hidden layer 464, having nodes 474. The hidden layer 464 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data are communicated to the nodes 472 of the input layer, which then communicates the data to the hidden layer 464. The hidden layer 464 may be configured to determine the state of the nodes in the respective layers and assign weight coefficients or parameters of the nodes based on the edges separating each of the layers, e.g., an activation function implemented between the input data communicated from the input layer 462 and the output data communicated to the nodes 476 of the output layer 466. It should be appreciated that the form of the output from the neural network may generally depend on the type of model represented by the algorithm. Although the feedforward network 460 of FIG. 4A expressly includes a single hidden layer 464, other embodiments of feedforward networks within the scope of the descriptions can include any number of hidden layers. The hidden layers are intermediate the input and output layers and are generally where all or most of the computation is done.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

Figure 4A:
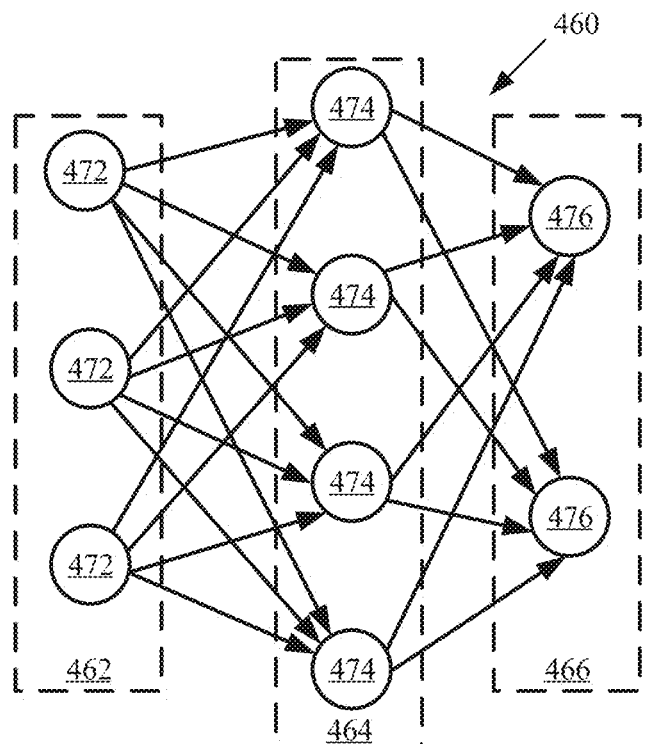
FIG. 4A is a diagram of a feedforward network, according to at least one embodiment, utilized in machine learning.
Figure 4C:
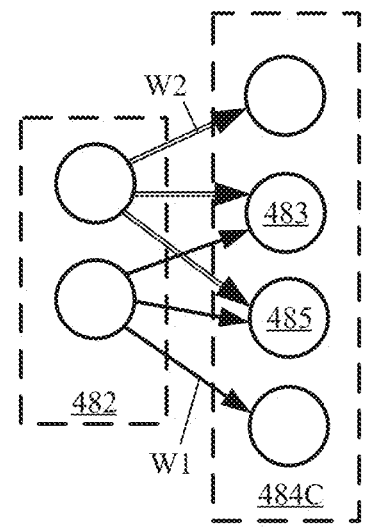
FIG. 4C is a diagram of a portion of the convolution neural network of FIG. 4B, according to at least one embodiment, illustrating assigned weights at connections or neurons.
Figure 4B:
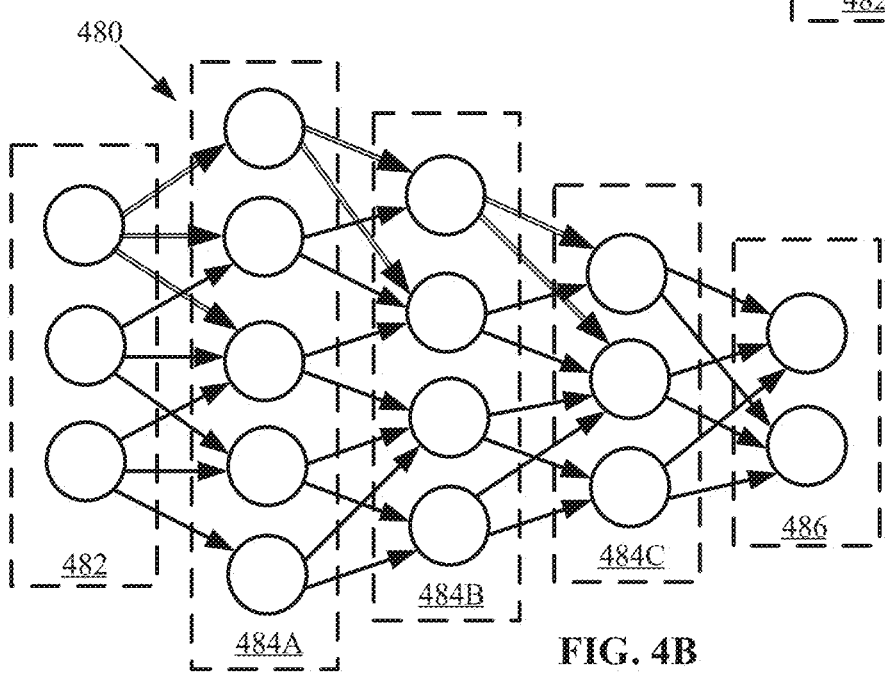
FIG. 4B is a diagram of a convolution neural network, according to at least one embodiment, utilized in machine learning.

An exemplary convolutional neural network CNN is depicted and referenced as 480 in FIG. 4B. As in the basic feedforward network 460 of FIG. 4A, the illustrated example of FIG. 4B has an input layer 482 and an output layer 486. However where a single hidden layer 464 is represented in FIG. 4A, multiple consecutive hidden layers 484A, 484B, and 484C are represented in FIG. 4B. The edge neurons represented by white-filled arrows highlight that hidden layer nodes can be connected locally, such that not all nodes of succeeding layers are connected by neurons. FIG. 4C, representing a portion of the convolutional neural network 480 of FIG. 4B, specifically portions of the input layer 482 and the first hidden layer 484A, illustrates that connections can be weighted. In the illustrated example, labels W1 and W2 refer to respective assigned weights for the referenced connections. Two hidden nodes 483 and 485 share the same set of weights W1 and W2 when connecting to two local patches.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

Figure 5:
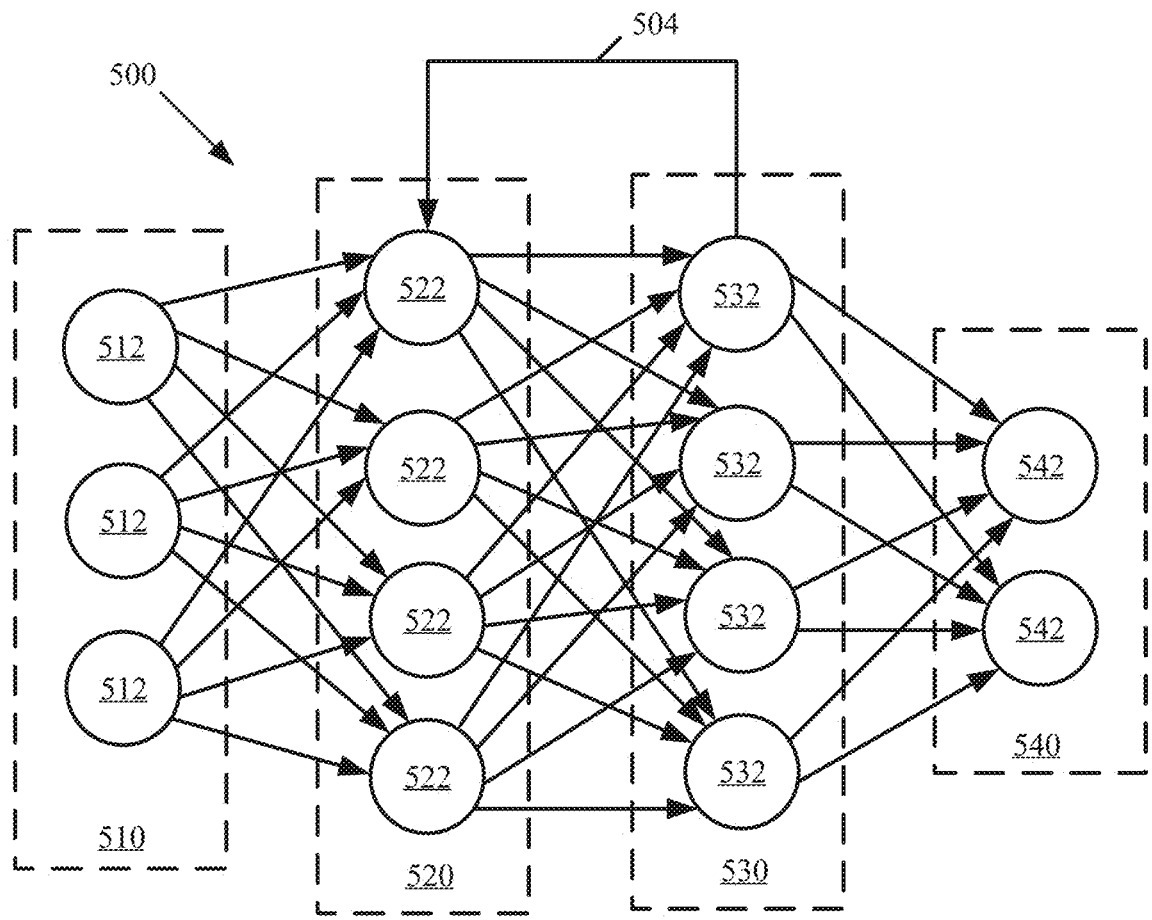
FIG. 5 is a diagram of a Recurrent Neural Network RNN, according to at least one embodiment, utilized in machine learning.

An example for a Recurrent Neural Network RNN is referenced as 500 in FIG. 5. As in the basic feedforward network 460 of FIG. 4A, the illustrated example of FIG. 5 has an input layer 510 (with nodes 512) and an output layer 540 (with nodes 542). However, where a single hidden layer 464 is represented in FIG. 4A, multiple consecutive hidden layers 520 and 530 are represented in FIG. 5 (with nodes 522 and nodes 532, respectively). As shown, the RNN 500 includes a feedback connector 504 configured to communicate parameter data from at least one node 532 from the second hidden layer 530 to at least one node 522 of the first hidden layer 520. It should be appreciated that two or more and up to all of the nodes of a subsequent layer may provide or communicate a parameter or other data to a previous layer of the RNN 500. Moreover and in some embodiments, the RNN 500 may include multiple feedback connectors 504 (e.g., connectors 504 suitable to communicatively couple pairs of nodes and/or connector systems 504 configured to provide communication between three or more nodes). Additionally or alternatively, the feedback connector 404 may communicatively couple two or more nodes having at least one hidden layer between them, i.e., nodes of nonsequential layers of the RNN 500.

Figure 6:
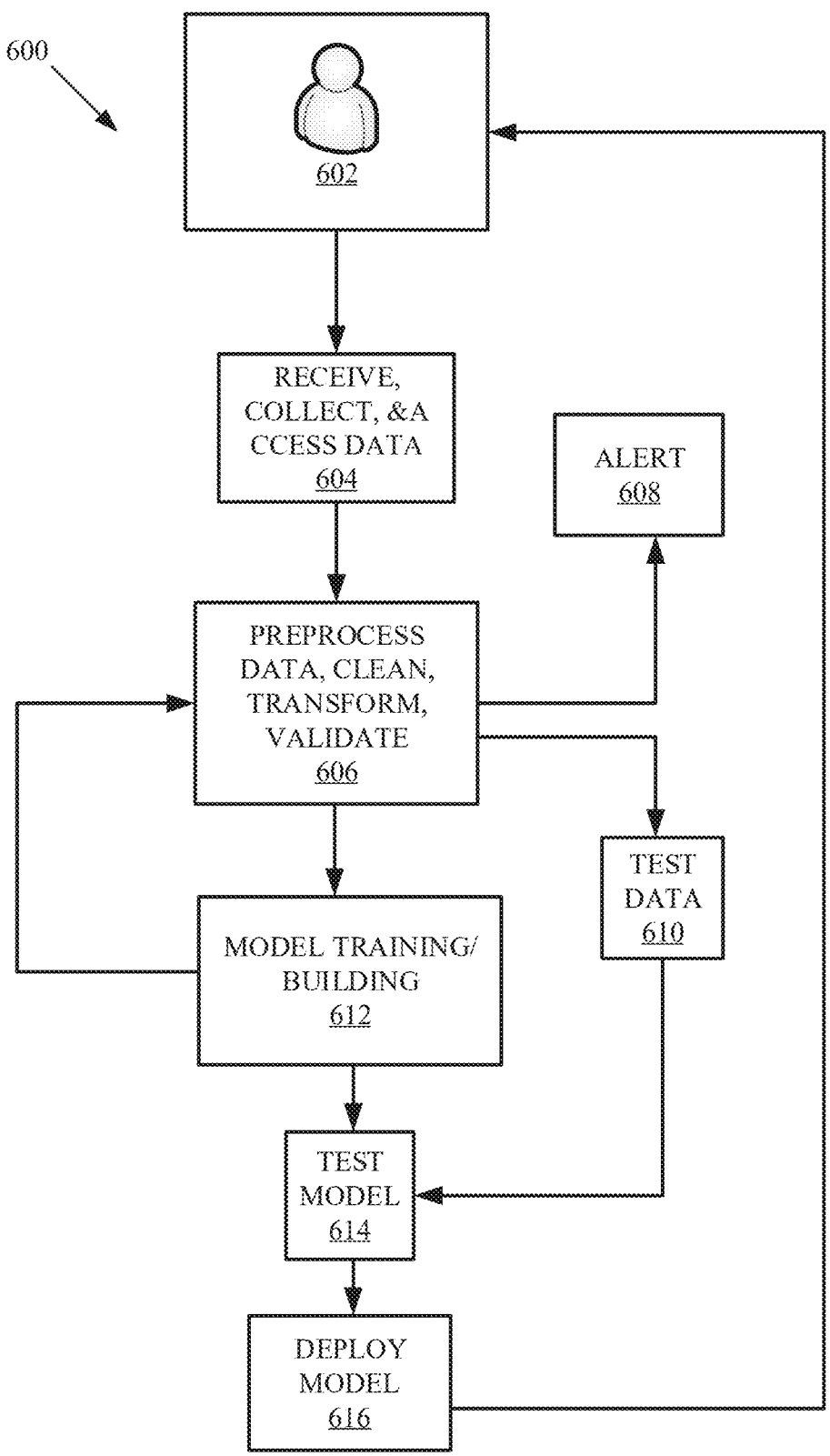
FIG. 6 depicts an example flow chart representing a method, in accordance with an embodiment of the present invention.

FIG. 6 depicts an example flow chart representing a method 600 of model development and deployment, in accordance with an embodiment of the present invention. At step 602, a user (e.g., a system administrator) authorizes, requests, manages, or initiates the method 600 to train the model. In a first iteration, step 602 represents a starting point; however, step 602 may also represent an opportunity to receive additional user input via a feedback loop in an ongoing learning workflow. At step 604, data are received, collected, and accessed or otherwise acquired as part of data ingestion. At step 606, the data ingested at step 604 is preprocessed by, for example, a cleaning and/or data transformation into a digestible format. In addition, the incoming data may be versioned for each training of the model such that newly trained models are tied to a set of versioned data. Thus, if new data are subsequently collected and entered, a new model can be trained that incorporates the new version of data. Step 606 may also incorporate data validation to confirm that the statistics of the ingested data are within expected numerical ranges, within expected categories, appropriately distributed, etc. If any anomalies are detected in the data, the training may pause or terminate and an alert may be distributed, as indicated by step 608, to one or more users.

At step 610, training test data such as a target variable value is inserted into an iterative training and testing loop, and at block 612 the model is trained in the iterative training and testing loop based on iteratively adjusting weights and calculations for each prediction of the target variable, performed by testing the model at block 614, in order to improve predictability of the target variable. For example, in an early iteration the target variable may be incorrectly predicted, and the weights and/or calculations may be updated in subsequent iterations of step 612 to train the model with the updated weights and/or calculations. Upon satisfying a compliance or satisfactory predictability threshold such that the model accurately satisfactorily predicts the target variable (e.g., with greater than 95% accuracy or some other threshold value) then the model may be deployed at step 616. Once deployed, the model may be used to perform artificial intelligence processes such as, for example, to interpret context and interrelationships or words and used as part of an encoder-only transformer process.

Disclosed herein is a new and useful production machine software/computing system that is capable of recording all information about a production machine that would be relevant for analyzing production history and replaying or playing back that information in a synchronized format that is synced to instances in times. The software/computing system performs this synchronization by converting inputs received from a plurality of formats into a synchronized and compatible data format that can be represented using a graphical user interface to replay exact production history for any given moment in time.

Non-limiting example production machines in which the production machine software/computing system would apply include a computer numerical control (CNC) machine that is capable of functioning in different axes of motion (e.g., a 3-axis CNC machine, a 5-axis CNC machine, etc.). G-code (also RS-274) is the common name for the most widely adopted numerical control programming language utilized by CNC machines, however various embodiments of the invention may use any other appropriate code for controlling a CNC machine (e.g., conversational code). G-code is used in computer-aided manufacturing (CAM) software (e.g., Mastercam) to control CNC automated machine tools. Generally speaking, the g-code instructions are provided to a machine controller that instructs the motors of the machine where to move, how fast to move, and what path to follow. In one common application, the g-code defines the machining path for a cutting tool such that the tool is moved according to the instructions through a toolpath, thereby cutting away material from an object (such as a piece of metal or wood) to leave only the finished product. CAM software that can output multi-axis code with various compensation calls (i.e., length, diameter offsets, etc.) may be compatible with the synchronization software disclosed herein.

Example outputs that may be displayed via a GUI may depict a synchronized representation of data that reflects the G-code line being executed at a specific point in time, active G-codes, the I/O status, motor positions, axis load, and various other data obtained via sensors positioned at various points on the production machine or proximate to the production machine.

Example production machines may have a suite of sensors strategically positioned proximate various components in order to detect various environmental conditions. A computing system is in communication with the sensors and is used to monitor the environmental conditions. In some embodiments, a machine learning model such as that described by FIG. 6 is used to make the prediction about the environmental conditions based on typical operating procedures. In other embodiments, the machine learning model described by FIG. 6 may be used to predict what specific element or component of the machine or environment is likely causing certain anomalies or conditions.

In existing computer systems, when production data are analyzed, the data are not synchronized in a format that allows for time-based analysis. Often when a production machine has a production error/problem (e.g., an abnormality, aberration, irregularity, defect, failing, etc.), it can be very challenging to diagnose what caused or is causing the error/problem. Sometimes the materials being used by a production machine are so expensive that it would be undesirous to replicate the conditions when the error/problem arose in order to diagnose what caused the error/problem. Manufacturers would benefit from a computing system that can more readily diagnose the cause of an error/problem by incorporating data from a number of different sources about the conditions of the production machine at a specific point in time when the error/problem occurred. Oftentimes, data obtained from sensors, external data sources, and/or user inputs are often stored locally or in a non-standardized format of whatever hardware or software platform performs data monitoring. It is difficult for manufacturers to fully understand and have insight into the environmental conditions, production material conditions, machine conditions, operators involved in operating the machine, and all the other variables that could impact production. Currently, manufacturers have to contact different software companies or utilize software from different companies that monitor different conditions, or these manufacturers have to rely on their own internal record keeping in an effort to piece together the conditions at the time the error/problem occurred, which is often incomplete since such records are in separate locations that are not timely or readily shared or cannot be consolidated due to format inconsistences.

To solve these errors/problems, the computing systems disclosed herein collects, converts, and consolidates production machine data from various data sources into a standardized format and stored the standardized production machine data to one or more storage locations. In some embodiments, the systems generates reports that may be sent to various individuals that work for the manufacturer, external parties that build the productions machines, warranty companies, etc. to provide information that would help diagnose the cause of a error/problem. The systems can provide remote access to a GUI to view the status of a production machine in real time or at selected time periods that can be defined by the user (i.e. over the past week, month, two days, etc.). Advantageously, as a non-limiting example, if certain parts or components were loosened or disrupted due to one production load of a production run but the error/problem was not noticed until several production runs later, it may be hard for a manufacturer to diagnose when the error/problem occurred or what caused the error/problem. The disclosed systems allow a user to replay all of the conditions over a certain amount of production runs by selecting, via a GUI, a time period for analysis in order to pinpoint the moment when the error/problem first started. The system could then use a machine learning model as described by FIG. 6 to ascertain a likely cause of the error/problem based on conditions that may have been different than expected at the moment when the error/problem first started.

The system may be used to determine or otherwise diagnose that an error/problem that occurred or is occurring and the machine learning model may predict the cause of the error/problem given the historical data and the data for the time period being analyzed. Whenever the data are obtained, it will first be converted into a standardized format and then stored in the collection of production machine data and, once stored, the processor may immediately generate display data to display the information in real time in order to provide the end user with information about the production machine's condition. This eliminates the need for end users to look up information from different sources and consolidate all of the feedback in an effort to diagnose a likely cause of a problem.

In various embodiments, the system may diagnosing one-time or continuous/ongoing aberrations, anomalies, abnormalities, errors, or problems that negatively affected production performance. In some embodiments, data external to the system may be used by the machine learning model to make the prediction about the source of the problem. In some embodiments, the system may distribute notifications about a problem to one or more computing devices. For example, if problem is detected, a notification may appear on the computer screen located near the production machine. In some embodiments, a text message or an email may be sent to one or more user devices (e.g., based on a saved notification list). In some embodiments, the system may assess the severity of the problem and indicate a severity level as part of the notification (e.g., high alert, medium, low, etc.).

In some embodiments, the system may decide a likely source of the problem as well as a recommended course of action. For example, the system may determine and display, via a GUI, if one or more adjustments can or should be made to the machine to resolve the problem. For example, the system may provide a series of recommendations that are ranked or prioritized in accordance with the most likely reason for the problem based on the prediction made by the machine learning model. In some embodiments, the machine learning model described by FIG. 6 may be used to predict what caused the error/problem and/or what can be done to resolve the problem.

Figure 7:
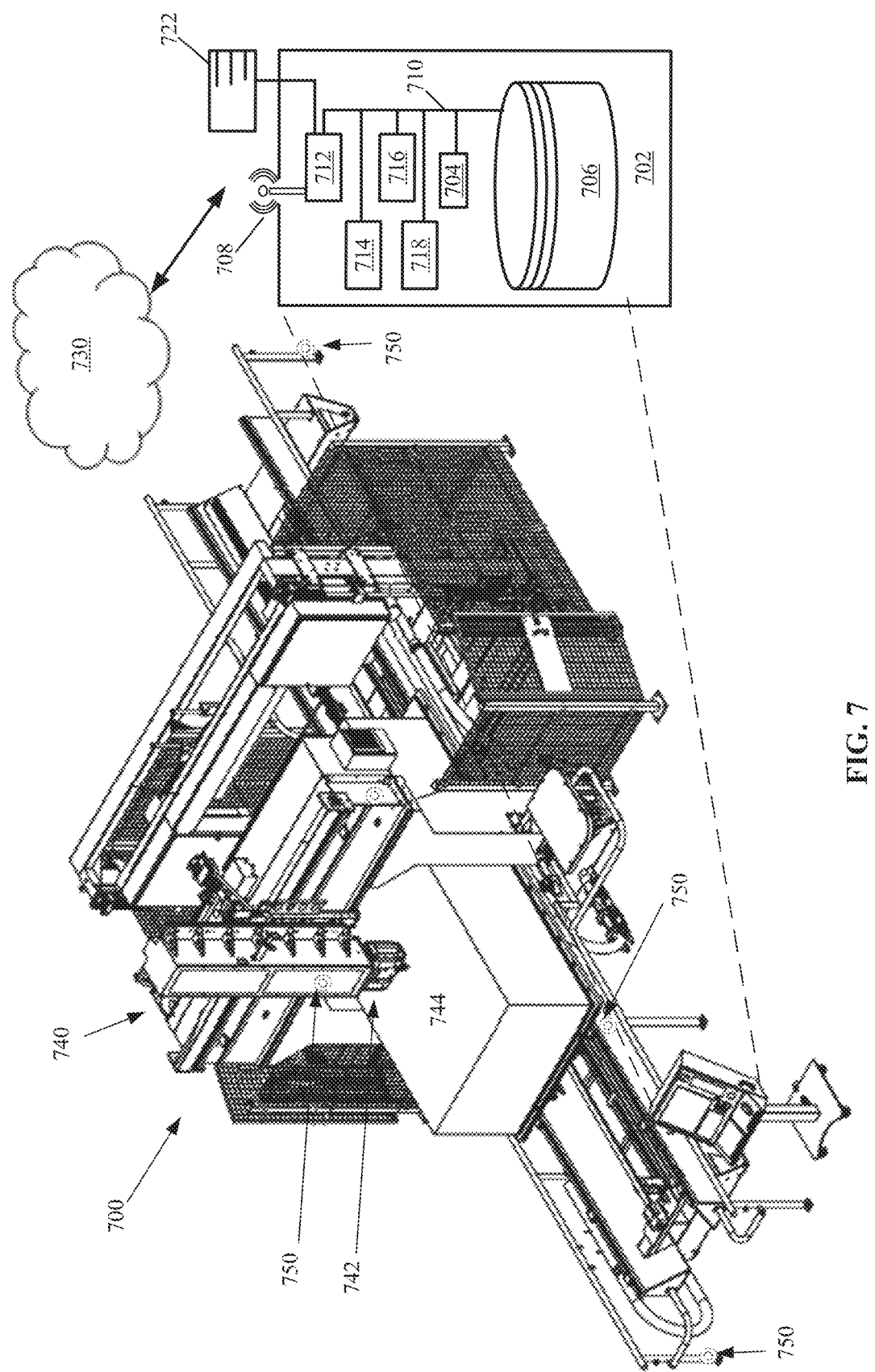
FIG. 7 depicts an example production machine system, accordance with an embodiment of the present invention.

FIG. 7 depicts an example production machine system 700, accordance with an embodiment of the present invention. The system 700 may include a production machine 740 that is communicatively connected to a computing system 702. The production machine 740 may include an arm, a spindle, or other component 742 that facilitates production of one or more products 744. The production machine system 700 may include at least two sensors 750 located at various locations of the production machine 740. For example, sensor(s) 750 may be positioned near the arm 742 that shapes, forms, or otherwise produces the products 744. In addition or alternatively, sensor(s) 750 may be positioned on a surface upon which the product(s) is/are positioned during manufacture. Sensor(s) 750 may be positioned on the legs near the floor, near/on support structures, moving parts, or in any location on the machine where it would be advantageous to receive data inputs. The computing system 702 may include at least one processor 704 and a memory device 706 that sores executable code. The processing device may include RAM, ROM, or any other non-transitory storage medium. The instructions can include instructions for an operating system and/or various other programs. The memory device 706 can store data inputs that are monitored and may be operatively coupled to the processor 704 via an intraconnect 710 (e.g., a system bus, a high-speed interface, and/or other electrical connection). The computing system may also include a communication interface 712 operatively coupled to a communication device 708. The communication interface 712 can include digital signal processing circuitry and may provide two-way communications and data exchanges, for example wirelessly via wireless communication device 708. Communications may be conducted via various modes or protocols, such as GSM voice calls, SMS, EMS, MMS messaging, TDMA, CDMA, PDC, WCDMA, CDMA2000, and GPRS. The communication device 708 can include, for example, a radio-frequency transceiver, a Bluetooth device, Wi-Fi device, a near-field communication device, and/or transceivers. In some embodiments, the sensor(s) 750 may be in wired communication via wired connection 722 and/or wireless communication via the communication device 708 with the computing system 702. The computing system 702 may include an input/output system 714. The input/output system 714 may include input/output circuitry that may operatively convert analog signals and other signals into digital data, or may convert digital data to another type of signal. For example, the input/output system 714 may receive and convert physical contact inputs, physical movements, or auditory signals to digital data. The input/output circuitry may convert vibration waves to digital data in order to evaluate the data inputs associated with a vibration. The input/output system 714 may be operatively coupled to a display 716 (e.g., a liquid crystal display (LCD), light emitting diode (LED) display, or the like). The display 716 may graphically display baseline data inputs for vibrations and any aberrations in the baseline data inputs. The computing system 702 may also be operatively coupled to a power source 718.

Figure 8:
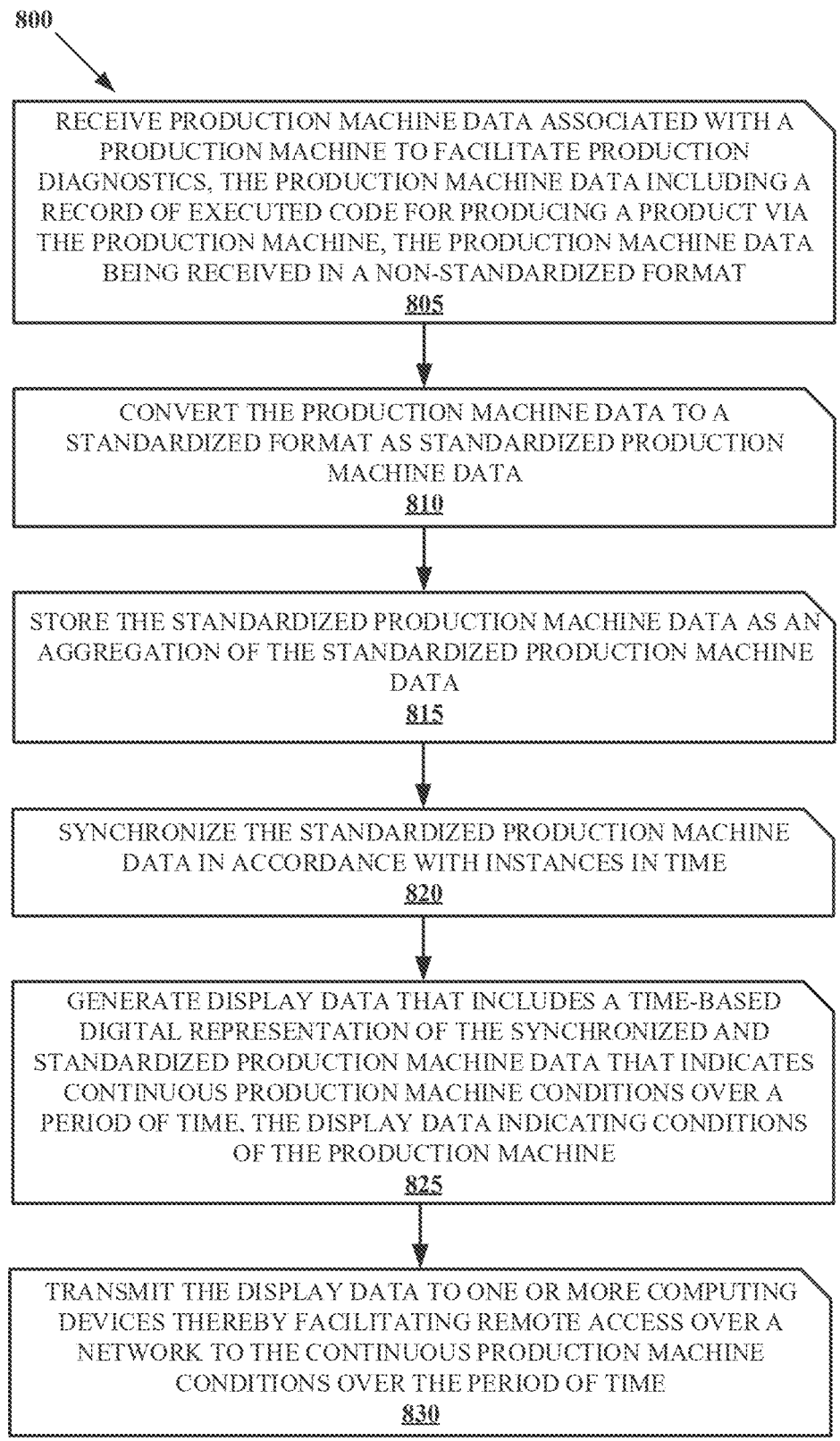
FIG. 8 is a block diagram of an example computer-implemented method, in accordance with an embodiment of the present invention.

FIG. 8 is a block diagram of an example method 800 for, in accordance with an embodiment of the present invention. At block 805, the system receives production machine data associated with a production machine to facilitate production diagnostics, the production machine data including a record of executed code for producing a product via the production machine, the production machine data being received in a non-standardized format. In some embodiments, the production machine data further includes sensor data received from at least two sensors associated with the production machine. In some embodiments, the production machine data also includes at least one of the input-output status of the production machine, motor position data associated with a motor of the production machine, arm axis data that indicates the angles and directional positioning of the arm (e.g., that performs cutting, shaping, operating, or otherwise functional actions) of the production machine, material load data about the raw material being used to produce the product (e.g., size, shape, weight, quantity, material, composition, material temperature, etc.), and user input data (e.g., settings selected by a user, information about a user, etc.). In some embodiments, the production machine includes a CNC machine. In some embodiments, the record of executed code includes geometric code (G-code).

At block 810, the system converts the production machine data to a standardized format as standardized production machine data. At block 815, the system stores the standardized production machine data as an aggregation of the standardized production machine data. At block 820, the system synchronizes the standardized production machine data in accordance with instances in time. At block 825, the system generates display data that includes a time-based digital representation of the synchronized and standardized production machine data that indicates continuous production machine conditions over a period of time, the display data indicating conditions of the production machine.

At block 830, the system transmits the display data to one or more computing devices thereby facilitating remote access over a network to the continuous production machine conditions over the period of time. In some embodiments, the display data includes the continuous production machine conditions in real time. For example, a user may access a real-time graphic of the continuous conditions of the production machine over time, which may enable the user to monitor the production conditions. In some embodiments, transmission of the display data initiates display of a GUI that depicts the continuous production machine conditions over the period of time. The GUI can include one or more control inputs configured to receive information about the period of time for which the conditions of the production machine are to be displayed. In some embodiments, transmission of the display data is initiated or otherwise triggered by an error/problem (e.g., abnormality, aberration, irregularity, defect, failing, etc.) in the conditions of the production machine. In some instances, the system predicts, via a trained machine learning model such as the one described above in reference to FIG. 6, a likely cause of the error based on the conditions of the production machine. In some embodiments, the system further trains the machine learning model to predict the likely cause of the abnormality, the training including using an iterative training and testing loop that makes adjustments in each iteration to improve accuracy of the machine learning model. In some embodiments, transmission of the display data is initiated/triggered according to a predefined schedule as part of regular reporting of the conditions of the production machine. In some embodiments, the system generates and displays a linear regression model indicating trends that lead to the error/problem.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain the principles of one or more aspects of the invention and the practical application thereof, and to enable others of ordinary skill in the art to understand one or more aspects of the invention for various embodiments with various modifications as are suited to the particular use contemplated.

It is to be noted that various terms used herein such as "Linux®," "Windows®," "macOS®," "iOS®," "Android®," and the like may be subject to trademark rights in various jurisdictions throughout the world and are used here only in reference to the products or services properly denominated by the marks to the extent that such trademark rights may exist.

What is claimed is:

1. A computing system facilitating error control and recovery, the computing system comprising:
   at least one processor;
   a communication interface communicatively coupled to the at least one processor; and
   a memory device storing executable code that, when executed, causes the at least one processor to:
   receive production machine data associated with a production machine to facilitate production diagnostics, the production machine data including a record of executed code for producing a product via the production machine, the production machine data being received in a non-standardized format;
   convert the production machine data to a standardized format as standardized production machine data;
   store the standardized production machine data as an aggregation of the standardized production machine data;
   synchronize the standardized production machine data in accordance with instances in time;
   generate display data that includes a time-based digital representation of the synchronized and standardized production machine data that indicates continuous production machine conditions over a period of time, the display data indicating conditions of the production machine; and
   transmit the display data to one or more computing devices thereby facilitating remote access over a network to the continuous production machine conditions over the period of time.

2. The system of claim 1, wherein the display data includes the continuous production machine conditions in real time.

3. The system of claim 1, wherein the production machine comprises a computer numerical control (CNC) machine.

4. The system of claim 1, wherein the production machine data further includes at least one selected from the group consisting of input-output status, motor position data, arm axis data, material load data, and user input data.

5. The system of claim 1, wherein the production machine data further includes sensor data received from at least two sensors associated with the production machine.

6. The system of claim 1, wherein the record of executed code includes geometric code (G-code).

7. The system of claim 1, wherein the transmitting initiates display of a GUI that depicts the continuous production machine conditions over the period of time.

8. The system of claim 7, wherein the GUI includes one or more control inputs configured to receive information about the period of time for which the conditions of the production machine are to be displayed.

9. The system of claim 1, wherein initiation of transmitting the display data is triggered by an error in the conditions of the production machine.

10. The system of claim 9, wherein the executable code, when executed, further causes the at least one processor to predict, via a trained machine learning model, a likely cause of the error based on the conditions of the production machine.

11. The system of claim 10, wherein the executable code, when executed, further causes the at least one processor to train the machine learning model to predict the likely cause of an abnormality, the training including using an iterative training and testing loop that makes adjustments in each iteration to improve accuracy of the machine learning model.

12. The system of claim 1, wherein initiation of transmitting the display data is triggered according to a predefined schedule as part of regular reporting of the conditions of the production machine.

13. A computer-implemented method, comprising:
receiving production machine data associated with a production machine to facilitate production diagnostics, the production machine data including a record of executed code for producing a product via the production machine, the production machine data being received in a non-standardized format;
converting the production machine data to a standardized format as standardized production machine data;
storing the standardized production machine data as an aggregation of the standardized production machine data;
synchronizing the standardized production machine data in accordance with instances in time;
generating display data that includes a time-based digital representation of the synchronized and standardized production machine data that indicates continuous production machine conditions over a period of time, the display data indicating conditions of the production machine; and
transmitting the display data to one or more computing devices thereby facilitating remote access over a network to the continuous production machine conditions over the period of time.

14. The computer-implemented method of claim 13, wherein the display data includes the continuous production machine conditions in real time.

15. The computer-implemented method of claim 13, wherein the production machine data further includes at least one selected from the group consisting of input-output status, motor position data, arm axis data, material load data, and user input data.

16. A production machine system, comprising:
a production machine that facilitates production of one or more products;
at least one processor;
a communication interface communicatively coupled to the at least one processor and the production machine; and
a memory device storing executable code that, when executed, causes the at least one processor to:
receive production machine data associated with the production machine to facilitate production diagnostics, the production machine data including a record of executed code for producing the one or more products, the production machine data being received in a non-standardized format;
convert the production machine data to a standardized format as standardized production machine data;
store the standardized production machine data as an aggregation of the standardized production machine data;
synchronize the standardized production machine data in accordance with instances in time;
generate display data that includes a time-based digital representation of the synchronized and standardized production machine data that indicates continuous production machine conditions over a period of time, the display data indicating conditions of the production machine; and
transmit the display data to one or more computing devices thereby facilitating remote access over a network to the continuous production machine conditions over the period of time.

17. The production machine system of claim 16, wherein the display data includes the continuous production machine conditions in real time.

18. The production machine system of claim 16, wherein the production machine data further includes at least one selected from the group consisting of input-output status, motor position data, arm axis data, material load data, and user input data.

19. The production machine system of claim 16, wherein the production machine data further includes sensor data received from at least two sensors associated with the production machine.

20. The production machine system of claim 16, wherein the record of executed code includes geometric code (G-code).

* * * * *